United States Patent [19]

Hamano et al.

[11] 4,245,331
[45] Jan. 13, 1981

[54] MEMORY PACK

[75] Inventors: Koichi Hamano; Takao Morimoto; Junko Watanabe; Kaoru Ono; Norio Yagi, all of Shizuoka, Japan

[73] Assignee: Tokyo Electric Co., Ltd., Tokyo, Japan

[21] Appl. No.: 945,124

[22] Filed: Sep. 25, 1978

[30] Foreign Application Priority Data

Oct. 8, 1977 [JP] Japan ............................. 52-121103
Oct. 8, 1977 [JP] Japan ............................. 52-121106

[51] Int. Cl.³ .......................... G11C 5/06; G11C 7/00
[52] U.S. Cl. ............................... 364/900; 340/656; 365/110; 235/7 R
[58] Field of Search ............... 340/636, 656; 365/226, 365/229, 110, 234; 364/900 MS File, 200 MS File; 235/7 R

[56] References Cited

U.S. PATENT DOCUMENTS

| | | | |
|---|---|---|---|
| 3,281,816 | 10/1966 | Raymond | 340/636 |
| 3,534,354 | 10/1970 | Galginaitis | 340/636 |
| 3,609,711 | 9/1971 | Gunn | 365/226 |
| 3,916,691 | 11/1975 | Hollander et al. | 340/636 |

Primary Examiner—Gareth D. Shaw
Assistant Examiner—E. Chan
Attorney, Agent, or Firm—Frishauf, Holtz, Goodman & Woodward

[57] ABSTRACT

A memory pack is provided having a random access memory connected between a positive power source terminal and a ground terminal, an addressing terminal coupled with the random access memory, and a data input/output terminal coupled with the random access memory. The memory pack further includes an LED energizing terminal, a light emission element which is connected between the LED energizing terminal and a positive power source terminal, the LED being lit by an energizing signal applied to the LED energizing terminal, a RAM energizing terminal and a photocoupler which is connected between the RAM energizing terminal and the random access memory and which responds to an energizing signal applied to the RAM energizing terminal to apply an output signal to the random access memory thereby to set the random access memory to be operative.

5 Claims, 17 Drawing Figures

F I G. 5
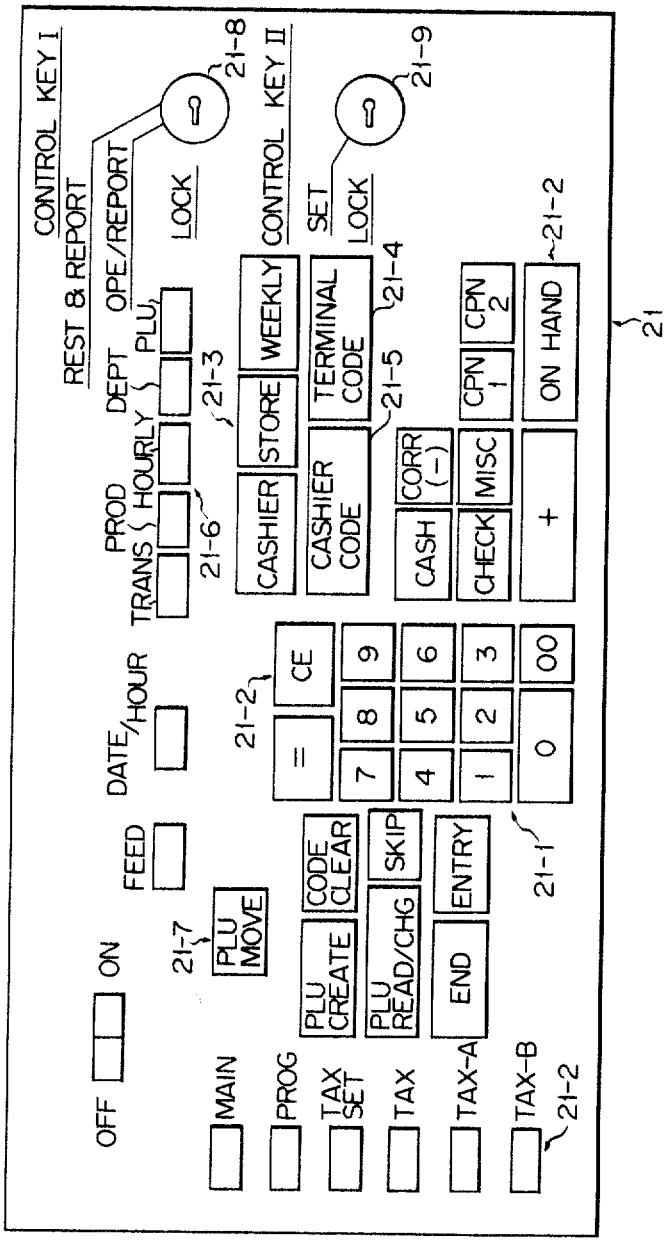

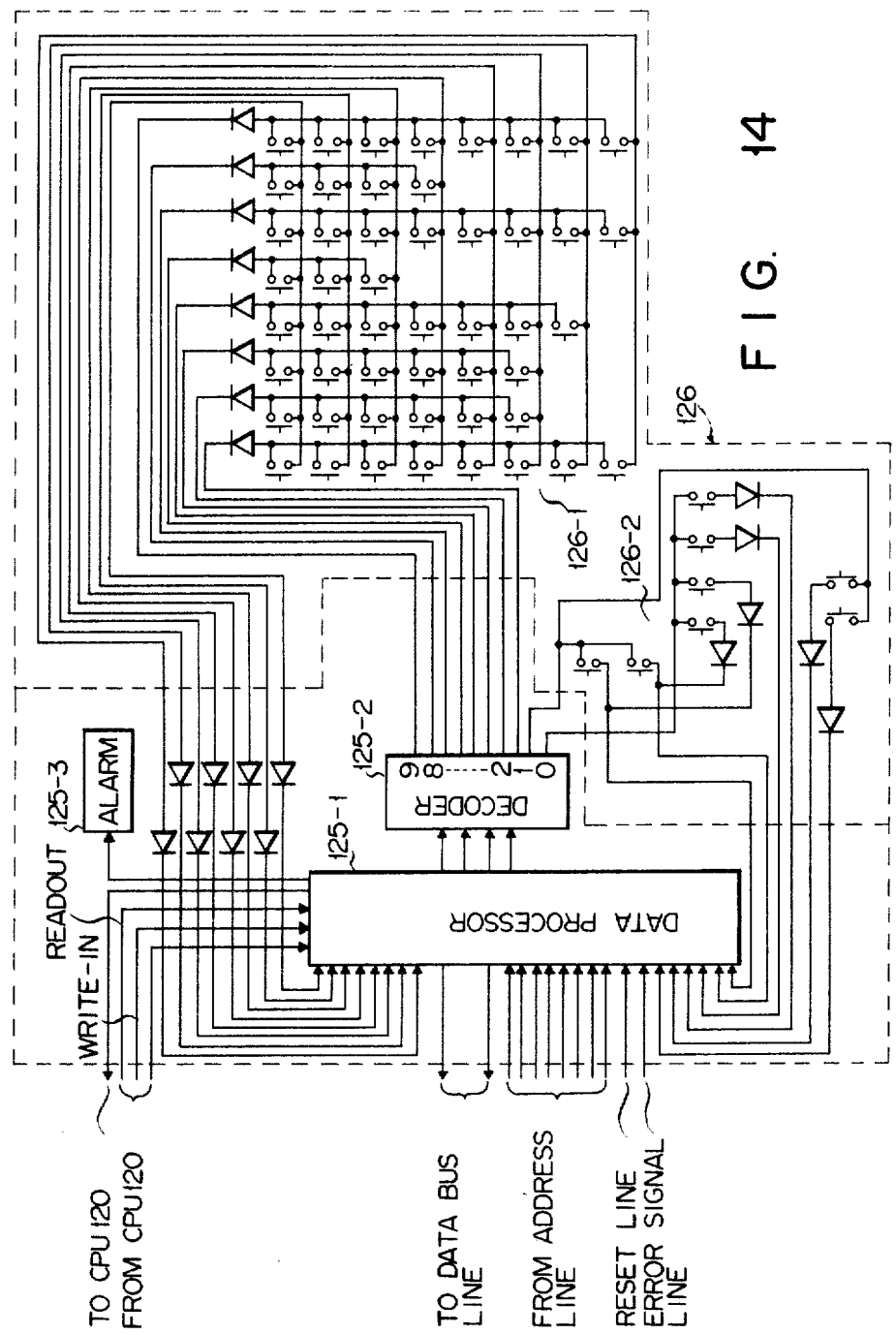
F I G. 14

MEMORY PACK

BACKGROUND OF THE INVENTION

The invention relates to memory packs used in an electronic cash register.

Recently, a number of cash registers are used in supermarkets, department stores, etc. The electronic cash register comprises a read only memory (ROM) storing a program and a random access memory (RAM) for storing the information to possibly be changed such as tax information and price look-up information. By convention, in order to change the information stored in the RAM, electronic cash registers ae used to individually write new information into the RAM. Since such an operation is troublesome and takes much time, a plurality of memory packs with a memory region corresponding to the memory region for storing the changeable information of the RAM, are used and the changeable information are commonly loaded into these memory packs by a store data processing apparatus. These memory packs are inserted into receptacles of the electronic cash registers. With such an arrangement, the information in the RAM may easily be changed.

However, the conventinal electronic cash register is not provided with a suitable means for checking whether this kind of memory pack is surely coupled with the cash register or not. Accordingly, proper information may fail to be loaded into the memory pack.

SUMMARY OF THE INVENTION

An object of the invention is to provide a memory pack having a light emission element which is energized to produce light when the memory pack is correctly coupled with an electronic cash register so that correct coupling of the memory pack with the electronic cash register can be properly indicated.

Accordingly to one aspect of the invention, there is provided a memory pack comprising memory means, one or more address designation terminals for providing an address signal to the memory means, one or more data input and output terminals which are connected to the memory means and transfer data to the memory means, an energizing terminal to be supplied with an energizing signal and light emission means which is connected to the energizing terminal and which responds to the energizing signal to emit light.

BRIEF DESCRIPTION OF THE DRAWINGS

FIGS. 3 to 5 are front views of a memory pack receptacle, a display and a keyboard of the store data processing apparatus shown in FIG. 2;

FIG. 14 is a circuit diagram of a keyboard drive circuit and a keyboard circuit shown in FIG. 13;

DESCRIPTION OF THE PREFERRED EMBODIMENTS

Figure 1:
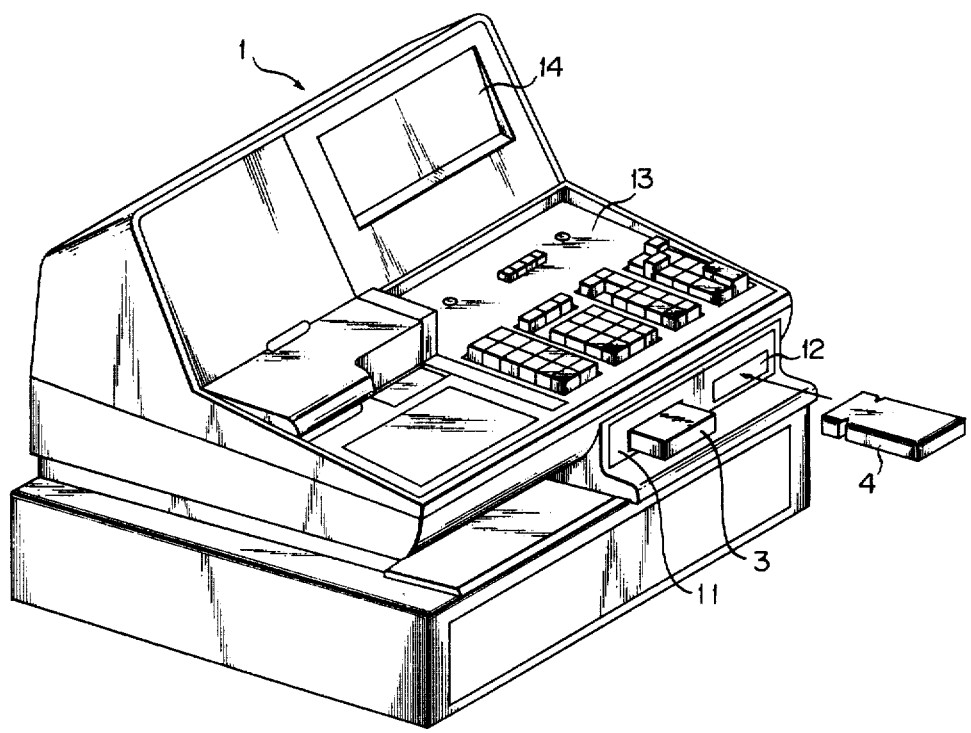
FIG. 1 shows a perspective view of an electronic cash register.
Figure 2:
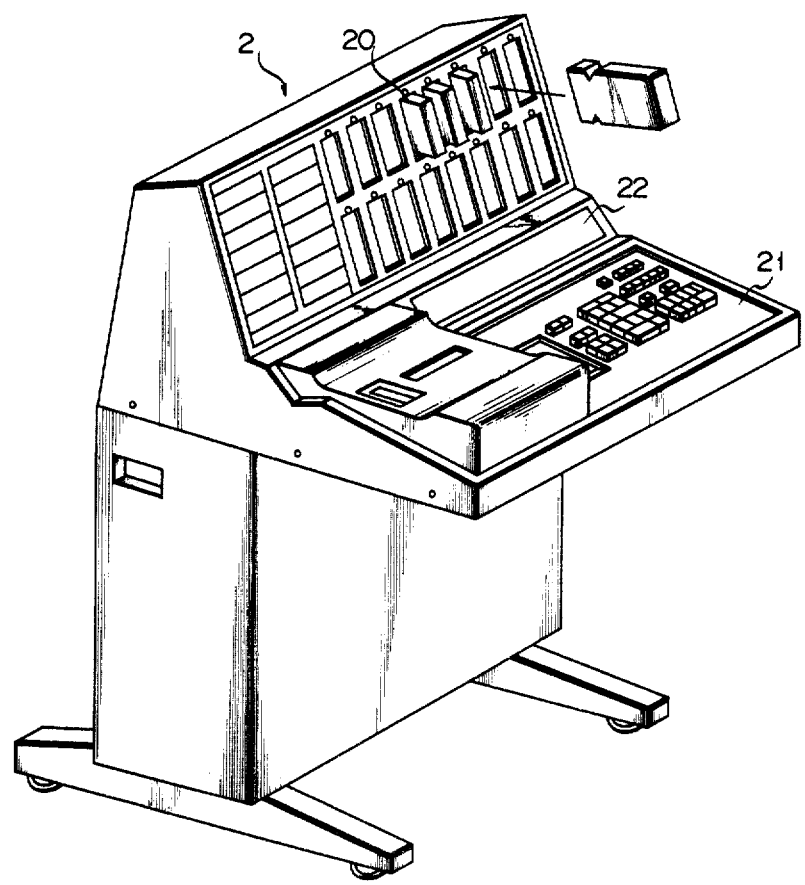
FIG. 2 shows a perspective view of a store data processing apparatus combined in use with the electronic cash register.

Referring now to FIG. 1, there is shown the external appearance of an electronic cash register according to an embodiment of the invention. FIG. 2 shows a store data processor associated with the cash register shown in FIG. 1. The embodiment uses two kinds of memory packs; a memory pack for terminal 3 and a memory pack for cashier 4.

First, a given number of terminal memory packs 3 are inserted into receptacles in the memory pack receiving section 20 of the store data register (SDP) 2. Then, through proper key operations on the keyboard 21, specific terminal code numbers are entered into the terminal memory packs 3 and common data such as a tax table and price looking-up (PLU) data, are successively written into these memory packs 3. In other words, at least part of information to be stored in a ramdom access memory (RAM) of a conventional cash register is loaded into the terminal memory pack 3. Next, cashier memory packs 4 are inserted into the corresponding memory receiving section 20 of the SDP 2. Then, through various key operations on the keyboard 21, a cashier code, date and the like are loaded into the cashier memory pack 4. The memory packs 3 and 4 stored with the given information are inserted into the corresponding memory pack receptacles 11 and 12 of the cash register 1. After the loading of the memory packs, an operator, i.e. a cashier, can properly operate keys on the keyboard 13 to execute necessary works such as registration in the cash register 1, as in the case of the ordinary cash register. The registration data are stored in both the memory packs 3 and 4.

In the course of a day's work, when a cashier being engaged in operating a first cash register is ordered to operate a second cash register, she has only to insert her cashier memory pack 4 into the receptacle 12 of the second cash register. In this case, registration data resulting from her registering operation in the second cash register is written into her cashier memory pack 4, following the registration data which have been recorded by the registering operation in the first cash register. Loaded into the terminal memory pack 3 of the second cash register is the data resulting from the registering operation executed in the second cash register irrespective of the cashier. In this manner, the terminal memory pack 3 stores the registration data of a specified cash register and the cashier memory pack 4 stores the registration data by a specified cashier. Cash trays are provided for respective cashiers in pactical use and are removable from the cash register. That is, the cash tray can be carried by a specified cashier who is ordered to change cash registers to operate. According to the registration data stored in the cashier memory pack there must be coincidence with items and amount of cash, credit cards and the like accommodated in the cash tray used in the transaction of her work. In the verification, if both are not coincident with each other, this indicates that the cashier has made a registration error or something of the sort. Such a verification is performed at the end of a day's work, for example.

The memory packs 3 and 4 storing the registration data thus collected are removed from the individual cash registers 1 at the end of the work of a day and loaded into the SDP 2. The registration data of all the terminal memory packs 3 of given number are all collected to obtain the store sales total in the day, i.e. the net total of all the cash registers in the store. Further, the registration data of all the cashier memory packs are totalized to obtain the sales total of each cashier and the net total of all the cashiers, i.e. the sales total of the store in the day. The sales totals thus calculated from the memory packs 3 and 4 may be compared with each other to check the reliability of the sales data collected.

The construction of the SDP 2 follows.

Figure 3:
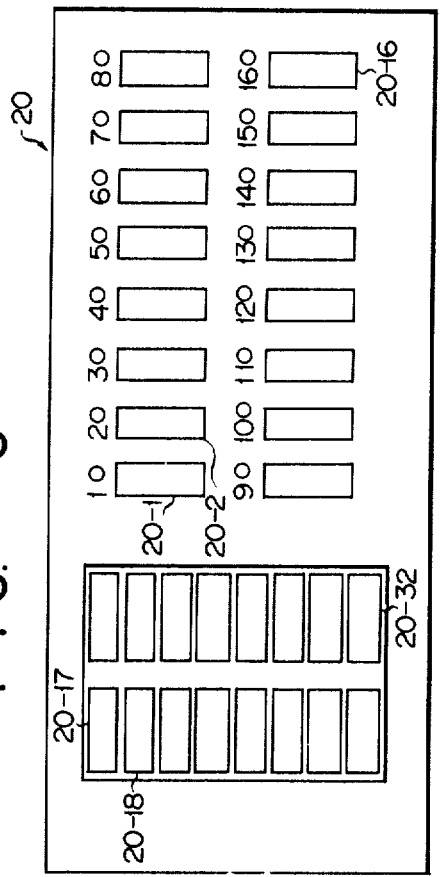

FIG. 3 shows a memory pack receiving section 20 of the SDP 2. For writing and reading data into and from memory packs, the memory packs are loaded into sixteen receptacles 20-1 to 20-16 for memory packs arranged in two rows. Each receptacle is provided with the numeral representing the receptacle number and a display lamp for indicating that reading and writing operations are now performed from and into the memory pack. Receptacles 20-17 to 20-32 for keeping memory packs being not used are additionally provided adjacent the receptacles 20-1 to 20-16.

Figure 4:
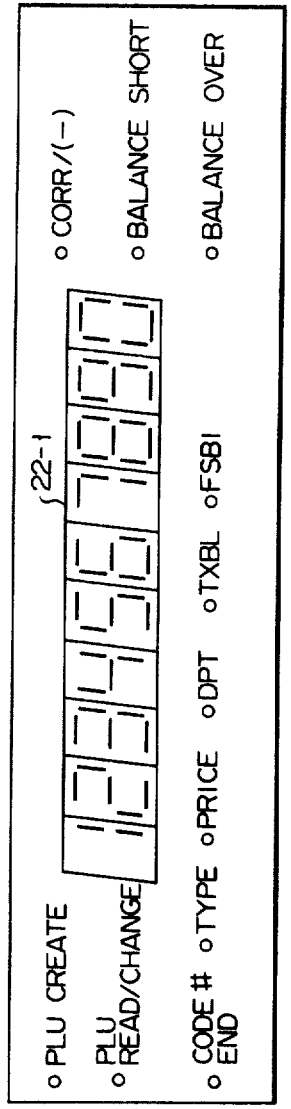

FIG. 4 shows a display section 22 of the SDP 2. In this example, a display unit of ten digits 22-1 is used in which the upper four digits are used to display the code number of a cashier and the number of a memory pack and the lower six digits, to display the amount information.

The display unit 22 in practical use is provided with various display lamps for indicating various operation modes. However, these are not essential to the invention, thus omitting them in the drawing.

FIG. 5 shows a keyboard 21 of the SDP 2. In the keyboard 21, there ae provided eleven entry keys 21-1 for indicating numerals "00", "0" to "9", register keys 21-2 for registering the information relating to receipts and payments of money, sales report keys 21-3 for preparing cashier, store and weekly sales reports, a terminal code key 21-4 for registering the terminal code number of the electronic cash register (ECR), a cashier code key 21-5 for registering the code number of a cashier, sales information selection keys 21-6 for preparing tables about the transaction information, production rate information, sales information per hour, sales information for each department, and sales information for each item code, and control keys 21-7 and 21-8 for setting operational modes. When the sales information selection key is once depressed, it is held at the depressed position until it is again depressed to be released.

Figure 6:
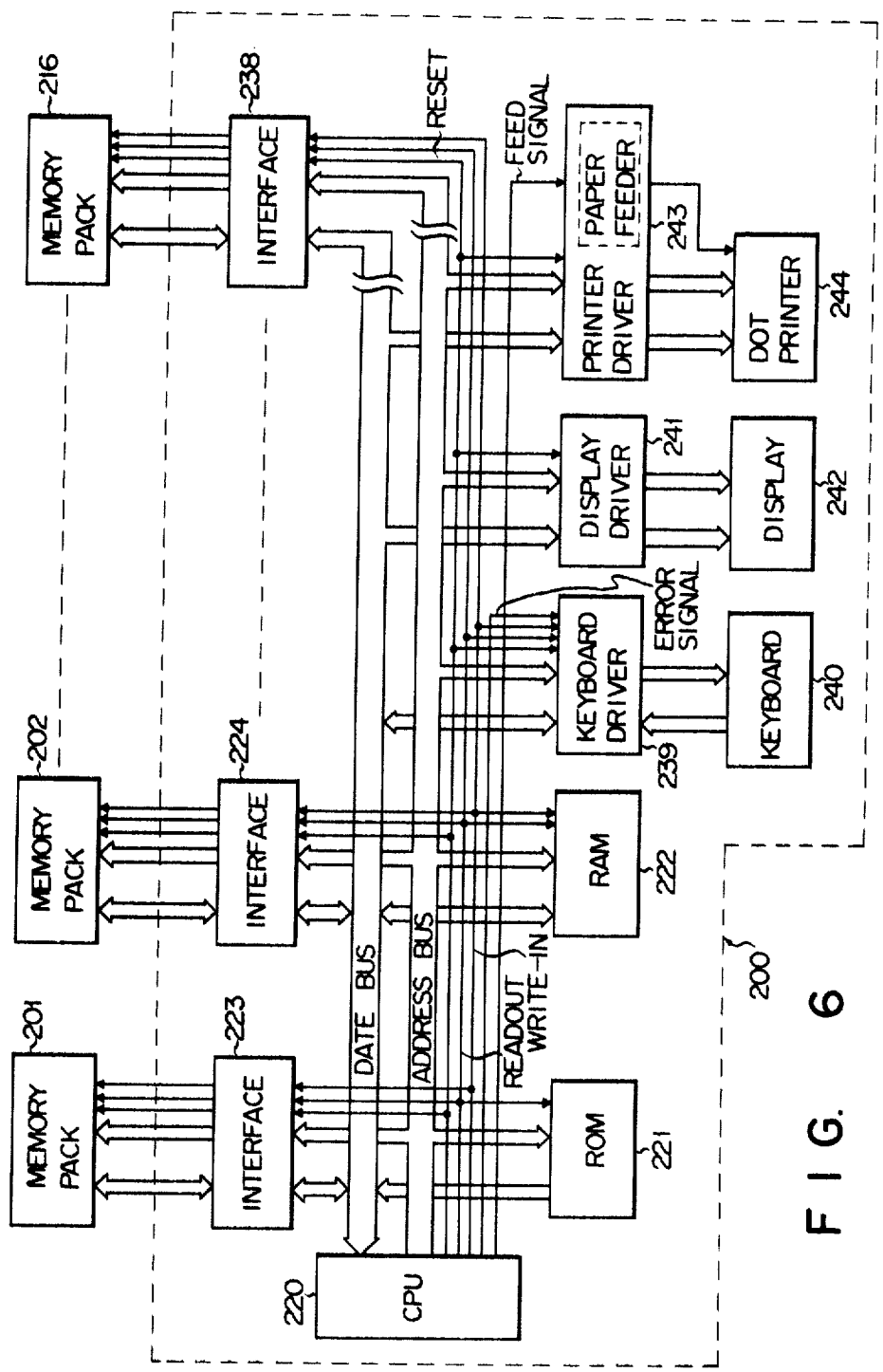
FIG. 6 shows an electronic circuit of the store data processing apparatus of FIG. 2.

FIG. 6 shows an electronic circuit section 200 of the SDP 2, and sixteen memory packs 201 to 216 coupled with an electronic circuit section 200. The electronic circuit 200 is comprised of a central processing unit (CPU) 220, a read only memory (ROM) 221, a random access memory (RAM) 222, and sixteen memory pack interfaces 223 to 238 for electronically coupling the CPU 220 with memory packs 201 to 216. These interfaces will be described later. The CPU 220 is coupled with a keyboard circuit 240 via a keyboard drive circuit 239 to be described later in detail. The same is connected to a display circuit 242 via a display drive circuit 241, and to a dot printer 244 via a printer driver 243.

Figure 7:
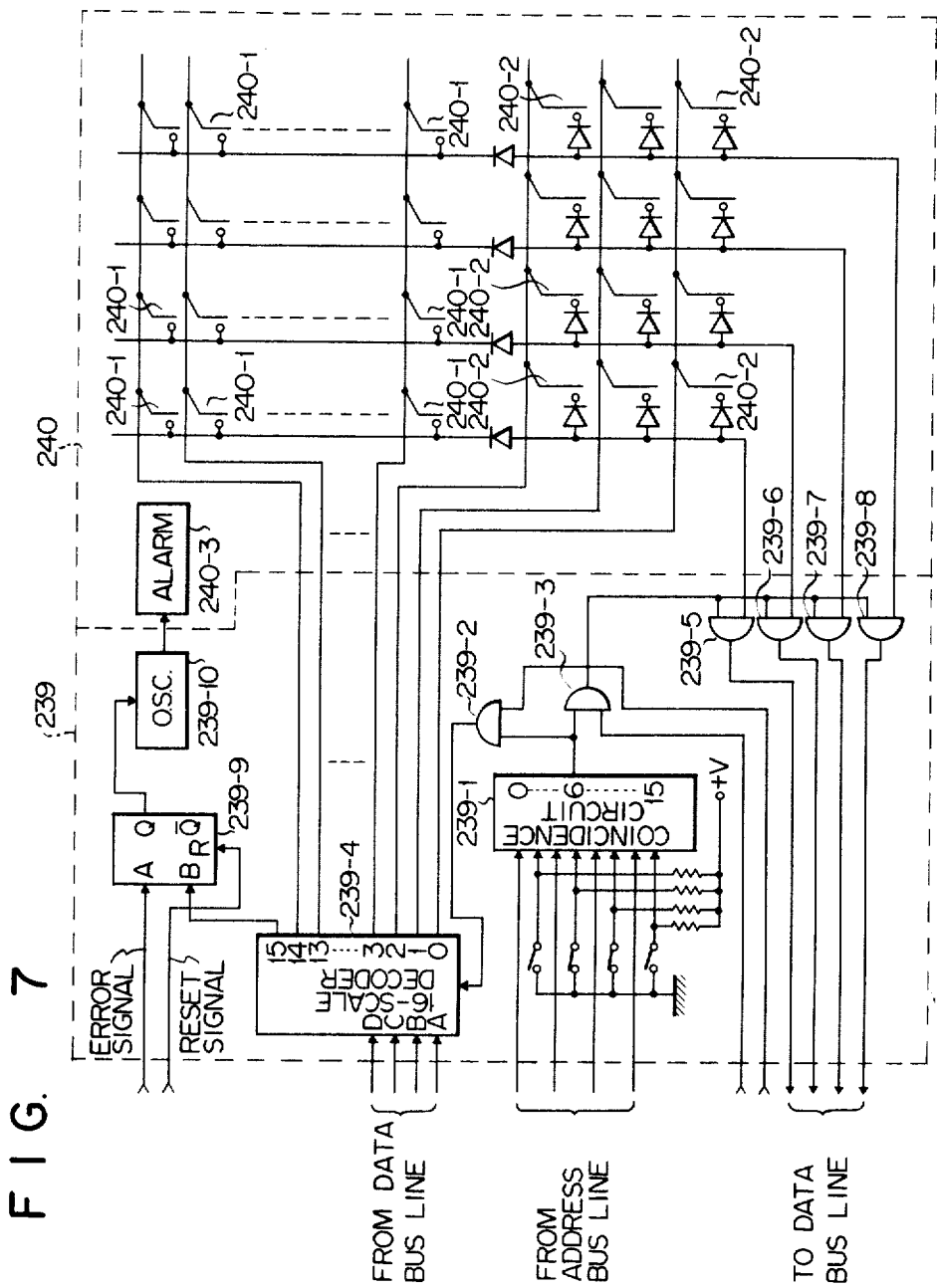
FIG. 7 shows circuit diagrams of the keyboard drive circuit and the keyboard circuit in FIG. 6.

FIG. 7 illustrates the details of the keyboard drive circuit 239 and the keyboard circuit 240. When an address signal "0110," for example, is delivered through an address bus line from the CPU 220, an address coincidence circuit 230-1 of the keyboard drive circuit 239 detects that the keyboard drive circuit 239 is selected. Upon the detection, the coincidence detection circuit 239-1 supplies an output signal from an output terminal 6 to AND gates 239-2 and 239-3. As a result, a write signal delivered through a write line from the CPU 220 is applied to a scale-of-16 decoder 239-4 thereby to set the decoder 239-4 to be operative. The thus conditioned decoder 239-4 responds to a data signal delivered through a data bus line from the CPU 220 to sequentially and repetitively produce at the output terminals "0" to "15" output pulses to keys 240-1 and 240-2 arranged in a key matrix of the keyboard circuit 240. the respective keys of the key matrix correspond to those shown in FIG. 5. The output signals of the key matrix are transferred through four AND gates 239-5 to 239-8 and bus lines to the CPU 220. The AND gates 239-5 to 239-8 are energized by a read signal delivered through the read line and the AND gate 239-3 from the CPU 220. In this manner, the CPU 220 detects what key is operated on the keyboard 21.

When an erroneous key is depressed, an error signal generated from the CPU 220 is applied to the input terminal A of a monostable multivibrator 239 via an error signal line. Upon the application, the multivibrator 229-9 produces at the output terminal Q a high level signal to be directed to an oscillator 239-10. The high level signal drives the oscillator to start its oscillation. The output sgianl from the oscillator 239-10 drives an alarm 240-3 to give an alarm. The multivibrator 239-9, after the error is removed, is switched in its state by an output pulse generated from the output terminal "15" of the decoder 239-4 and produces at the output terminal Q a low level signal to stop the operation of the oscillator 239-10.

Figure 8:
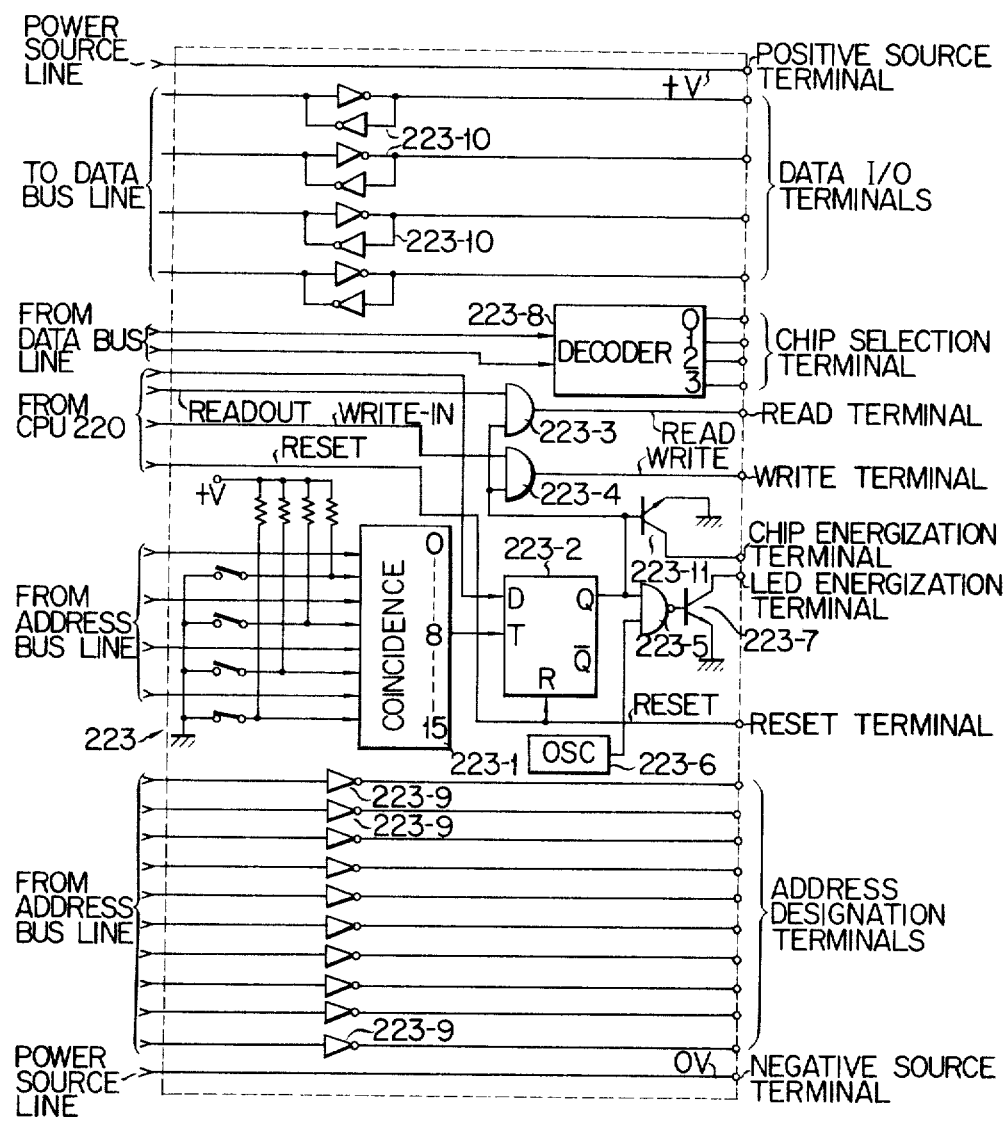
FIG. 8 shows a circuit diagram of the interface circuit shown in FIG. 6

FIG. 8 shows the detail of the memory pack interface 223 shown in FIG. 6. The remaining interfaces 224 to 228 each have the same construction as that of the interface 223 except that the address coincidence circuits 223-1 have their own codes.

The coincidence detection circuit 223-1 of the interface 223, as in the coincidence detection circuit 239 shown in FIG. 7, delivers at the output terminal "8", for example, to the input terminal T of the flip-flop circuit 223-2 when an address signal corresponding to a proper code formed by a plurality of switches is delivered thereto from the CPU 220. Under this condition, when the CPU 220 supplies a data transfer starting signal to the input terminal D of the flip-flop circuit 223-2 through the data bus line, the flip-flop circuit 232-2 supplies an output signal to the AND gates 223-3 and 223-4, a NAND gate 223-5, and a transistor 223-11 which is connected at the collector to a chip enregizing terminal and at the emitter to ground. As a result, a read signal and a write signal delivered through a read line and a write line from the CPU 220 pass the AND gates 223-3 and 223-4 so that the transistor 223-11 is rendered conductive. To the other input terminal of the NAND gate 223-5 is connected an oscillator 223-6 of which produces an output pulse to periodically turn on and off the transistor 223-7 through the NAND gate 223-5.

When an address signal with a specified code is not supplied to the coincidence detection circuit 223-1, the flip-flop 223-2 produces at the output terminal Q a low level signal so that the transistor 223-11 is kept at its conductive state and the NAND gate 223-5 produces a high level output signal to render a transistor 223-7 conductive. The transistor 223-7 is connected at the collector to an LED energizing terminal and at the emitter to ground. The reset terminal R of the flip-flop 223-2 is connected to the reset line coming from the CPU 220.

Responsive to the information signal delivered through the data bus line from the CPU 220, the decoder 223-6 produces at an output terminal "0", "1", "2" or "3" an output signal to select a memory chip of the memory pack coupled with the interface 223. The addressing of the memory pack is performed through a plurality of addressing lines including inverters 223-7 with buffer functions, and data transfer between the memory pack and CPU 220 is effected through a plurality of data lines including inverters 223-8 with bidirectional buffer function.

Figure 9:
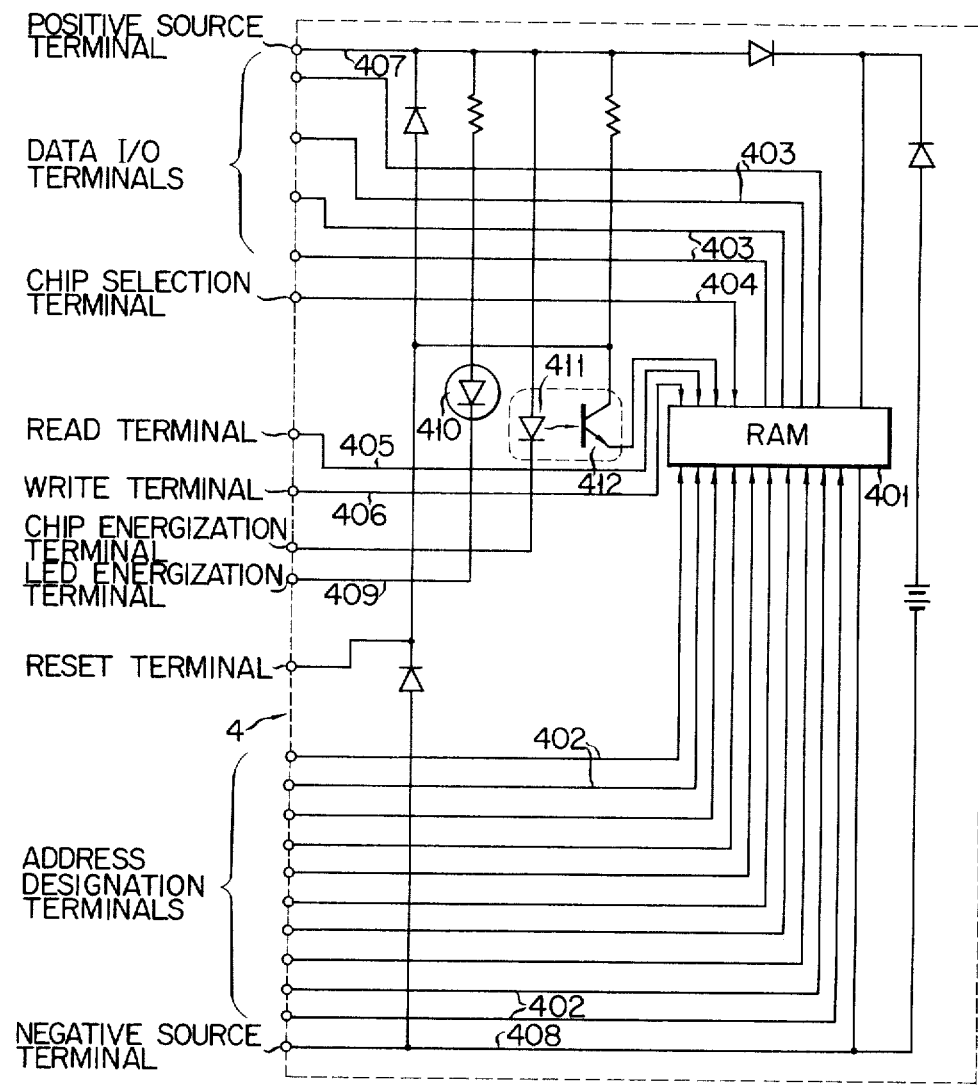
FIGS. 9 and 10 respectively show circuit diagrams of the cashier memory pack and the terminal memory pack shown in FIG. 6 according to an embodiment of the invention.

FIG. 9 shows a circuit diagram of a cashier memory pack 4. The memory pack 4 is inserted into the memory pack receiving section 20 of the SDP 2, so that the memory pack 4 circuit is coupled with the interface 223 shown in FIG. 8. A plurality of addressing lines 402 for addressing the random access memory (RAM) 401 are coupled with addressing lines with inverters 223-7. A plurality of data lines 403 for the RAM 401 are coupled with data lines with inverters 223-8. A selection line 404 for selecting the RAM 401 is coupled with the output terminal "0" of the decoder 223-6, and the read line 405 and the write line 406 for the RAM 401 are coupled with the AND gates 223-3 and 223-4, respectively. When the memory pack 4 is coupled with the interface 223, reading and writing of data from and to the RAM 401 are performed by an external power supply (not shown) through power source lines 407 and 408 of the memory pack 4 and a power source line of the interface 223. When the memory pack 4 is removed from the interface 223, the contents stored in the RAM 401 is held by an internal power source E. When the memory pack 4 is coupled with the interface 223, the LED energizing line 409 is coupled with the collector of the transistor 223-7 through the LED energizing terminal. The LED energizing line 409 connects the light emission element 410 between the power source line 407 and the LED energizing terminal. For example the light emission element 410 is formed of a photodiode disposed at a position as observed from the exterior, for example, on the surface opposite to the connector part of the memory pack. In a normal state, that is to say, when an address signal with a proper code is not supplied to the coincidence detection circuit of the interface 223, the transistor 223-7 is rendered conductive and the light emission diode 410 correctly coupled the interface is energized to emit light to visually indicate that the memory pack is correctly coupled with the interface 223. When information is transferred to the RAM 401, that is, when an address signal with its proper code and a data transfer initiating signal is supplied to the coincidence detection circuit of the interface 223, the flip-flop circuit 223-2 is set to produce at the output terminal Q a high level signal and the NAND gate 223-5 produced an inverted signal of the output signal from the oscillator 223-6 thereby to periodically turn on and off the transistor 223-7. As a result, the light emission element 410 of the memory pack 4 coupled with the interface 223 is flashed to indicate the memory pack is operating.

When the flip-flop circuit 232-2 is in a reset state, the transistor 223-11 is kept nonconductive so that the light emission diode 411 coupled between the power source terminal and the chip energizing terminal is not energized. Accordingly, the phototransistor 412 forming a photocoupler between the chip energizing terminal and the RAM 401, as well as the photodiode 411, is sustained in its nonconductive state so that no chip energizing signal is applied to the RAM 401. When the flip-flop circuit 232-2 is set and a high level signal is produced, the transistor 223-11 conducts and the light emission diode 411 is energized, with the result that light emitted from the photodiode 411 makes the transistor 412 conduct, thereby to energize the RAM 401.

Figure 10:
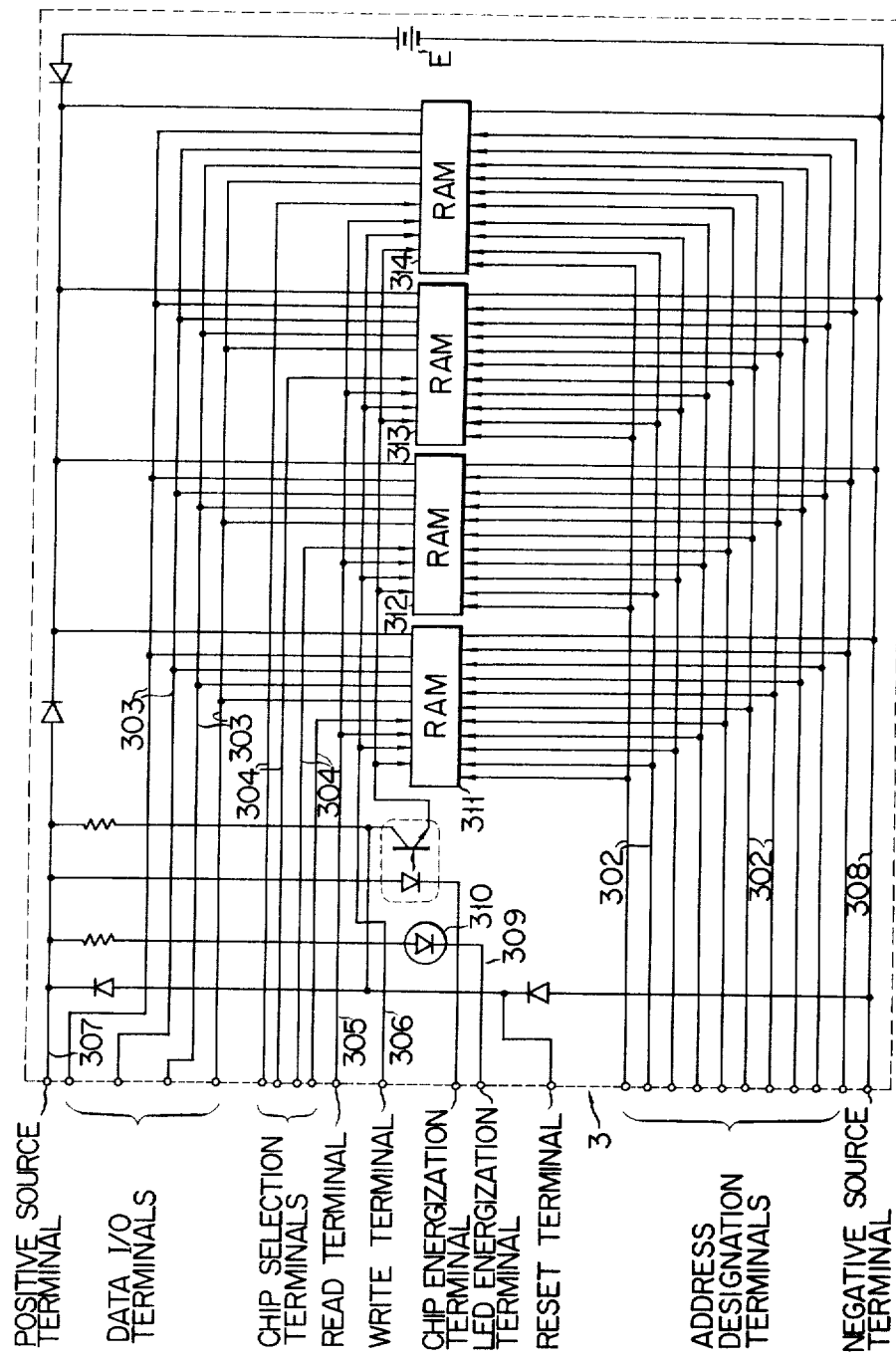

FIG. 10 shows a circuit diagram of the terminal memory pack 3. The circuit uses four RAMs 311 to 314 which are substantially the same as the cashier memory pack 4 shown in FIG. 9, except that four chip selection lines 304 for selecting threse RAMs are coupled with the output terminals "0", "1", "2" and "3" of the interface 223, respectively.

The construction of the cashier register 1 shown in FIG. 1 is explained in more detail.

Figure 11:
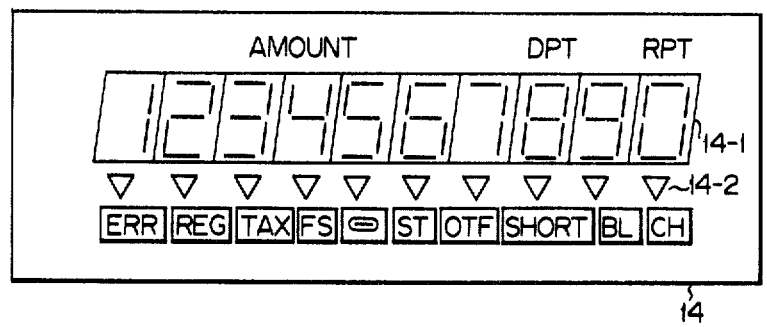
FIGS. 11 and 12 are front views of the display and keyboard sections of the electronic cash register shown in FIG. 1.

FIG. 11 shows a display section 14 used in ECR 1. The display section 14 is provided with a display unit 14-1 of ten digits. The upper six digits of the display unit 14-1 is used to display amount of money and the lower four digits thereof are used for the department and a repeat display. Incidentally, the display section 14 is provided with a plurality of display lamps 14-2 for indicating various operation modes.

Figure 12:
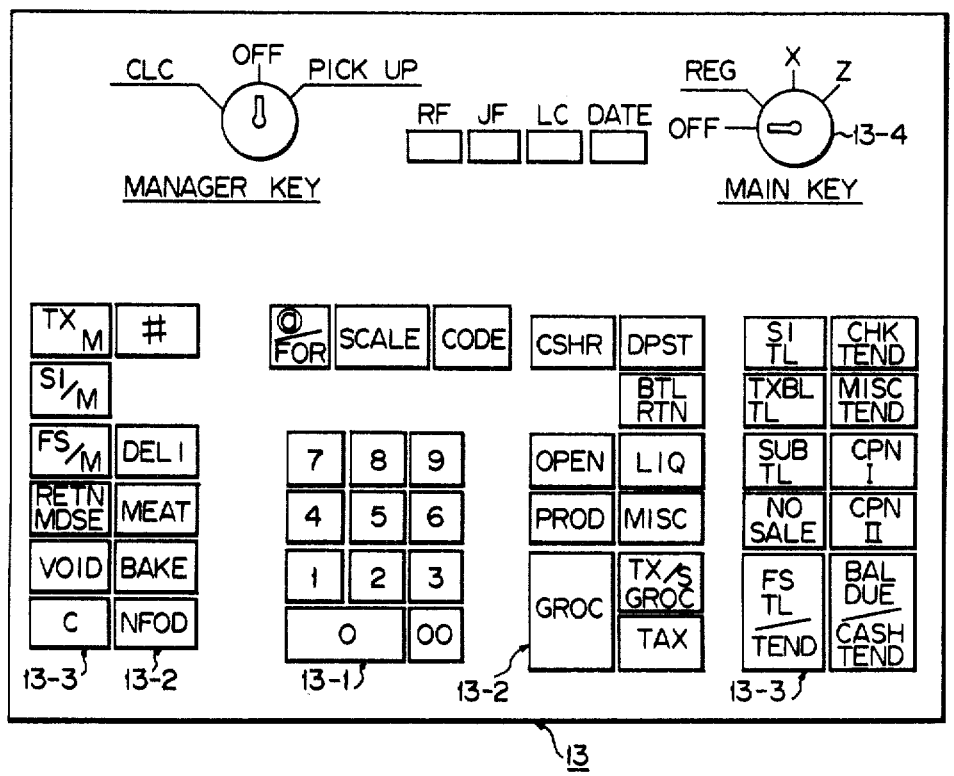

FIG. 12 shows the details of the keyboard 13 of the ECR 1. The keyboard 13, as is well known, includes 11 entry keys 13-1 operated when numerals "00", "0" to "9", a department key 13-2 for registering sold items for each department, a function key 13-3 for registering the contents of transaction, and a main key 13-4 for setting up a registering operation mode and the like.

Figure 13:
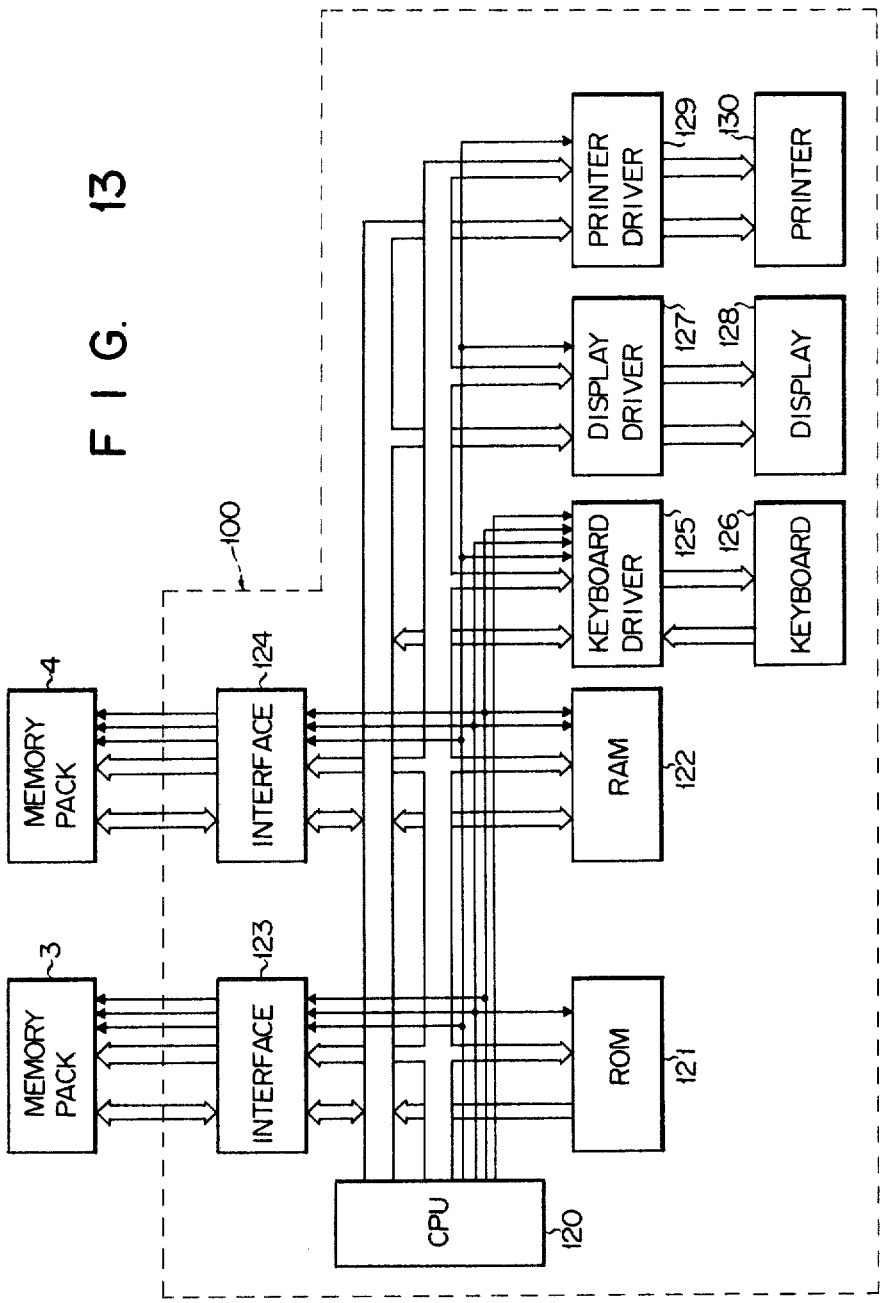
FIG. 13 is a circuit diagram of the electronic cash register shown in FIG. 1.

FIG. 13 shows an electronic circuit 100 of the ECR 1 and the cashier and terminal memories 4 and 3 shown in FIGS. 9 and 10 coupled with the electronic circuit 100. The electronic circuit 100 includes a central processing unit (CPU) 120, a read only memory (ROM) 121, a random access memory (RAM) 122, a terminal memory pack interface 123 for electrically coupling the terminal memory pack interface 123 with the CPU, and a cashier memory pack interface 124 for electrically coupling the cashier memory pack 4 with the CPU 120. The CPU 120 is connected to a keyboard circuit 126 through a keyboard drive circuit 125 to be described later, to a display circuit 128 through a display drive circuit 127 and to a printer circuit 130 through a printer drive circuit 129.

FIG. 14 shows a circuit diagram for illustrating the details of the keyboard drive circuit 125 and the keyboard circuit 126. This circuit is principally equal to the circuit shown in FIG. 7. The data processing circuit 125-1 has functions of the address coincidence circuit 239-1, the AND gates 239-2 and 239-3 and part of the CPU 220, and this circuit is constituted by an INTEL 8279, for example. The decoder 125-2, responsive to an address signal from the data processing circuit 125-1, successively and repeatedly produces output pulses from the output terminals "0" to "9". The keyboardcircuit 126 is formed of a key matrix 126-1 having a plurality of keys including entry keys, department keys, function keys and the like and a key array 126-2 having a plurality of keys corresponding to the control keys. When one of the keys of the key matrix 126-1 is operated, the key operation is detected by one of the output pulses from the decoder 125-2 and the information relating to the key operation is sent to the data processing circuit 125-1. The data processing circuit 125-1, upon receipt of the information relating to the key operation, supplies the key information corresponding to the input information to the CPU 120 through the data bus line and delivers a signal indicating the key operation to the CPU 120 through a key operation detection line. When one of the keys of the key array 126-2 is operated, the key operation is detected by an output pulse from the decoder 125-2 and information relating to the key operation is applied to the CPU through a data bus and at the same time a key operation detection signal from the data processing circuit 125-1 is applied to the CPU 120 through the key operation detection line.

In this manner, the circuit shown in FIG. 14 transfers the information corresponding to the key operated to the CPU 120, as well as in FIG. 7.

Figure 15:
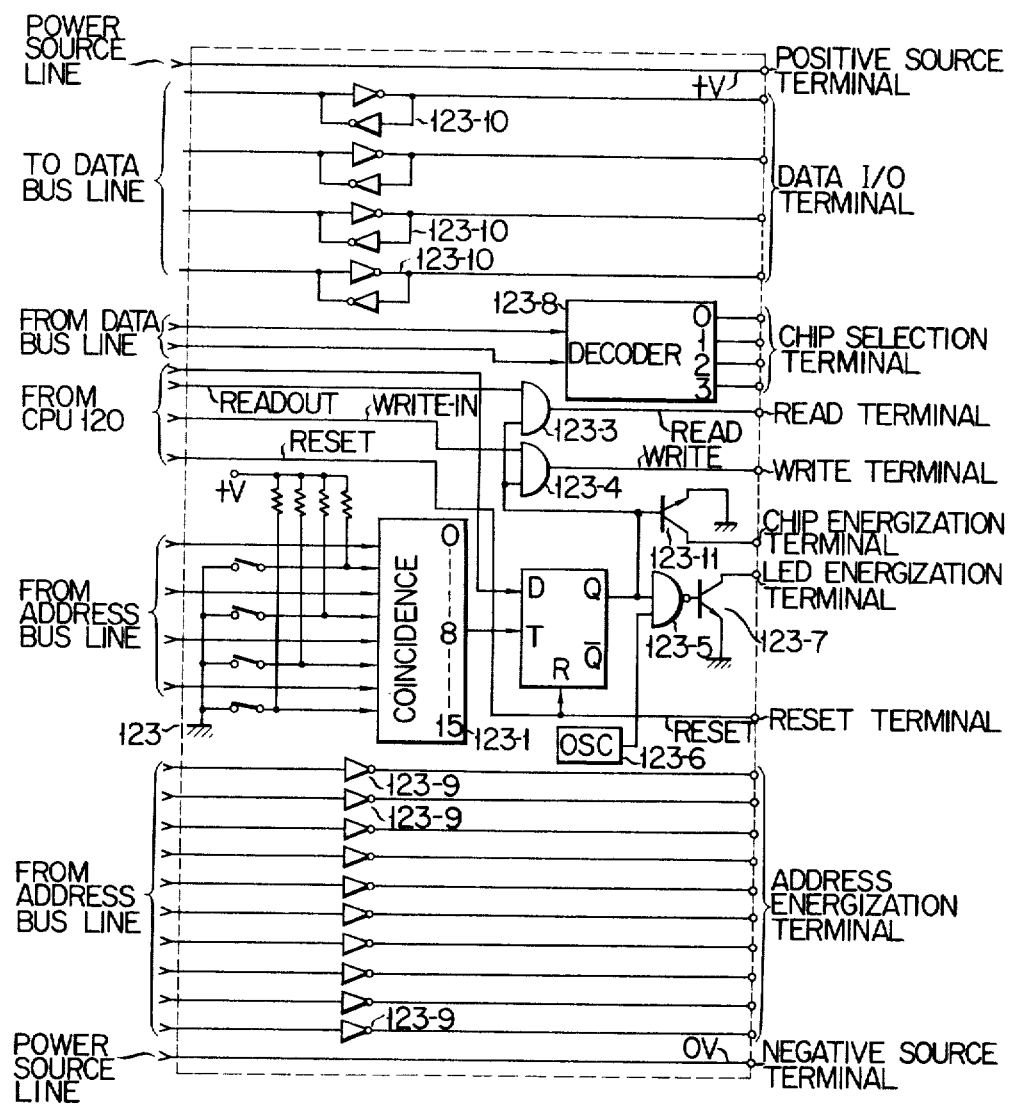
FIG. 15 is a circuit diagram of the interface circuit shown in FIG. 13.

FIG. 15 shows a circuit of the terminal memory pack interface 123. The interface 123 is similar in construction and operation to the interface 223 of the SDP 2 shown in FIG. 8. In the terminal memory pack interface 123 shown in FIG. 15, like reference numerals designate like circuits in FIG. 8. As a matter of course, the coincidence detection circuit 123-1 may be designed so as to assign a specified code to the address coincidence circuit 123-1. The cashier interface 124 may be constructed similar to the interface in FIG. 15 except that the code of the coincidence detection circuit is made different. The decoder 123-6 may be omitted in the cashier interface 124.

The operation of the ECR 1 and the SDP 2 will be given below.

First, a given number of terminal memory packs 3 to be used are loaded into the receptacles of the memory pack receiving section 20 of the SDP 2. In order to enter a terminal code into one of the terminal memory packs 3, the numeral information corresponding to the proper code of one of the address coincidence circuits 223 in the memory pack interfaces 223 to 228 (FIG. 6) is transferred to the coincidence detection circuit 223-1 by operating the entry key 21-1 (FIG. 5). Then, an "=" key in the function keys 21-2 is operated so that a signal is delivered to the D input terminal of the flip-flop circuit 223-2 which in turn, produces at the Q terminal a high level signal. As a result, a given RAM, for example, RAM 11, in the terminal memory pack 3 through the photodiode 309 and the phototransistor 310 is energized. The numeral information representing a desired terminal code is loaded into the RAM 311 by operating the entry key 21-1 and the terminal code key 21-4. The same operation will be performed when the terminal code is entered into another terminal memory pack. A proper terminal code is recorded onto all the terminal memory packs, and desired information is written into the terminal memory pack. The information writing operation is similar to the case where, in a conventional ECR, desired information is entered into the RAM of the register.

Figure 16:
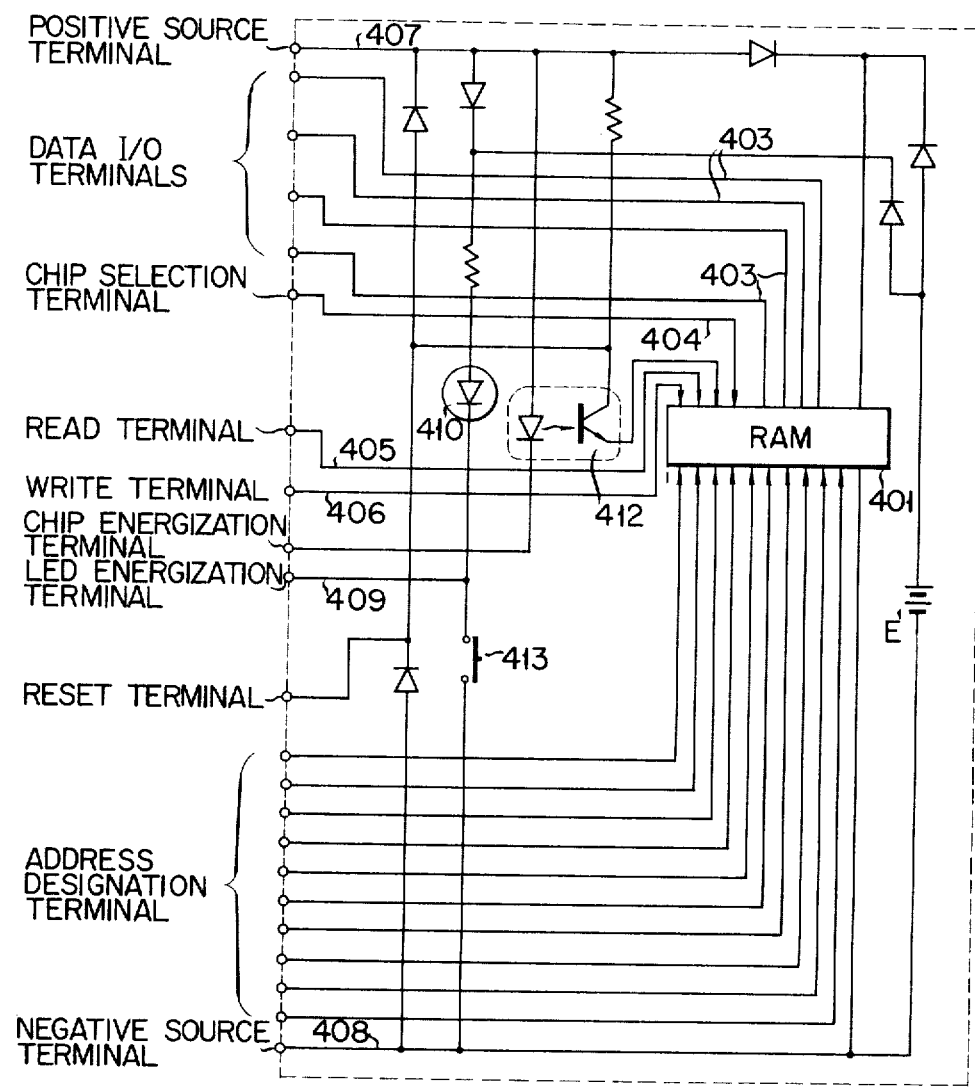
FIGS. 16 and 17 show modifications of the memory pack of FIG. 9.

FIG. 16 shows a modification of the cashier memory pack 4 shown in FIG. 9. The cashier memory pack is much the same as that shown in FIG. 9 except that a manual switch 413 is coupled between a light emission element 410 and a negative power source line 408. The manual switch 413 is preferably disposed at a proper position of the memory pack such that, when the cashier memory pack is not inserted into the receptacle of the ECR 1 or the SDP 2, it may be manually operated, while, when it is inserted into the receptacle, it is not accessible. Under a condition that the memory pack is not inserted into the receptacle, if the manual switch 413 is operated, the light emission element 410 is energized by a battery E to emit light thereby to indicate that the battery E has enough energy to drive the RAM 401.

Figure 17:
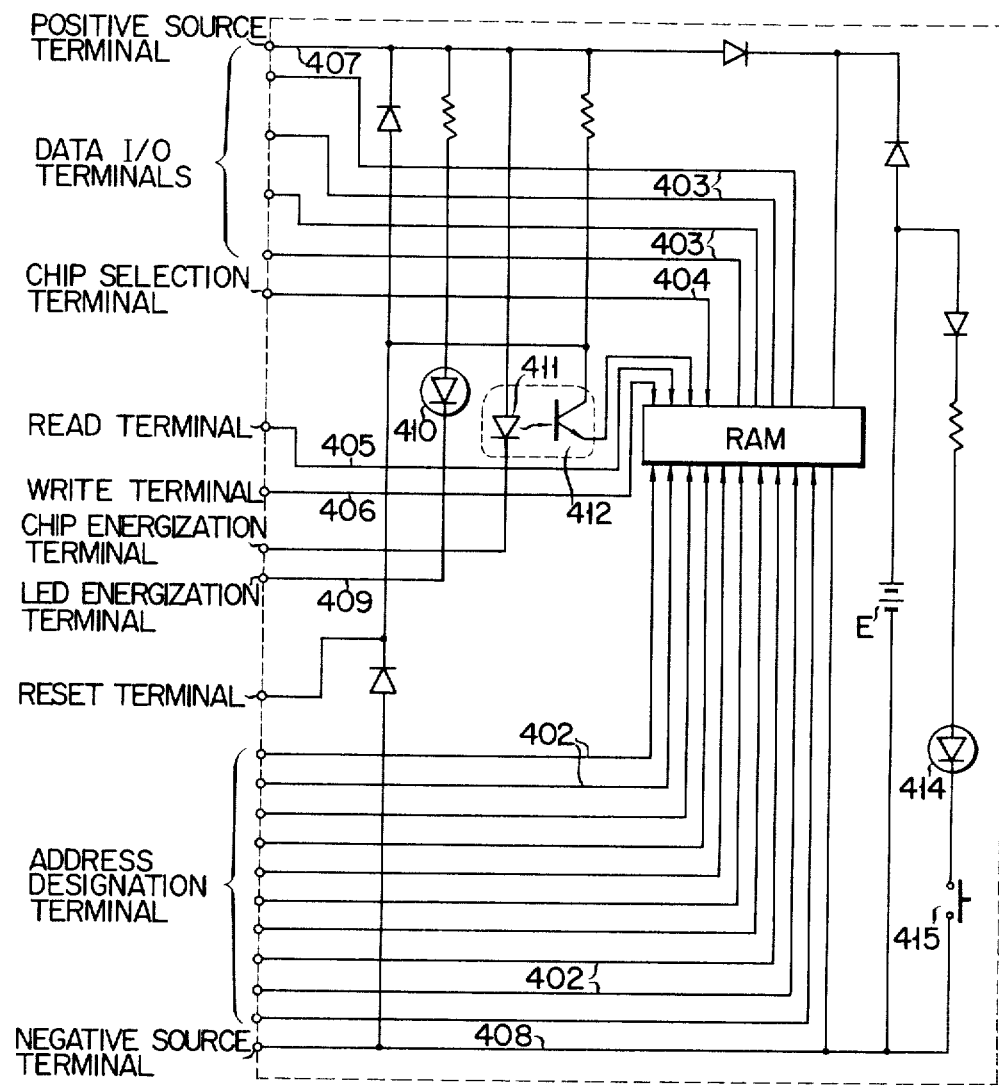

FIG. 17 shows another modification of the cashier memory pack shown in FIG. 9. The cashier memory pack is substantially the same as that in FIG. 9 except that a series circuit including a diode, resistor, a light emission element and a manual switch 415 is coupled between the battery E and the negative power source line 408. Like the switch 413 used in the cashier memory pack shown in FIG. 16, the switch 415 may be manually operated from the exterior. Upon manual operation, the light emission element 414 is energized by the battery E to emit light to visually indicate that the battery E has enough energy to drive the RAM 401.

The light emission elements used in FIGS. 16 and 17 are so designed as not to emit light even if the switch 413 or 415 is operated when the electromotive force of the battery E falls below a given value and is insufficient to drive the RAM 401.

While the invention has been described with reference to a specific embodiment, the invention is not limited thereto. In the example, the memory pack is used in the electronic cash register; however, the memory pack may be used as a part of an arithmetic memory section in a desk-top type calculator, for example.

What we claim is:

1. A memory pack mechanically, electrically and removably coupled with an electronic cash register, the electronic cash register including a data processing unit and a signal generator producing a chip energization signal serving to set a chip energization terminal at given potential in response to a predetermined control signal from the data processing unit, the memory pack comprising:

first and second power source terminals which are connectable to said cash register for supplying power from a power source;

memory means connected between said first and second power source terminals, said memory means being selectively settable in read and write modes;

at least one address terminal coupled to said memory means and connectable to said cash register for providing an address signal to said memory means from said cash register;

at least one data input/output terminal coupled to said memory means and connectable to said cash register for providing data to said memory means from said cash register;

read and write control terminals coupled to said memory means and connectable to said cash register for respectively receiving read and write control signals to set the read/write mode of said memory means;

said chip energization terminal being connectable between said signal generator of said cash register and a photocoupler to receive said chip energization signal; and said photocoupler including a light emitting element coupled to said chip energization terminal and to one of said power source terminals for emitting light in response to said chip energization signal applied to said chip energization terminal from said signal generator, and a phototransistor associated with said light emitting element and coupled between one of said power source terminals and memory means and which is energized in response to light generated from said light emitting element for energizing said memory means;

whereby, the memory means, is not energized as long as a chip energization signal is not supplied to the chip energization terminal, and the data stored in the memory means is not influenced even if an erroneous address signal has been applied to the memory means or noise has occurred in the power source line.

2. A memory pack according to claim 1, further comprising an indication energization terminal connectable to said signal generator, and a second operator visible light emitting element connected to said indication energization terminal to emit an operator visible light in response to a given output signal from said signal generator.

3. A memory pack according to claim 1, in which said first light emitting element is a light emitting diode.

4. A memory pack according to claim 1, further comprising switching means connected in series with said first light emitting element.

5. A memory pack according to claim 1, further comprising a series circuit including a second light emitting element and switching means coupled between said first and second power source terminals.

* * * * *